July 26, 1966  P. T. ALFONSI  3,262,361
PHOTOGRAPHIC ENLARGING EASEL AND MASK
Filed June 2, 1964  2 Sheets-Sheet 1
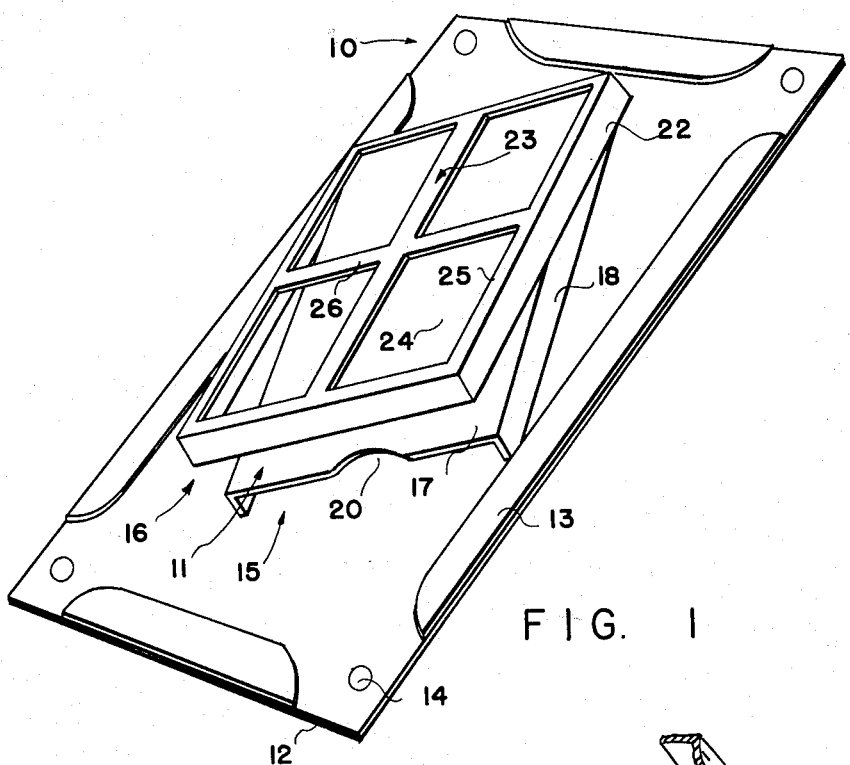
FIG. 1
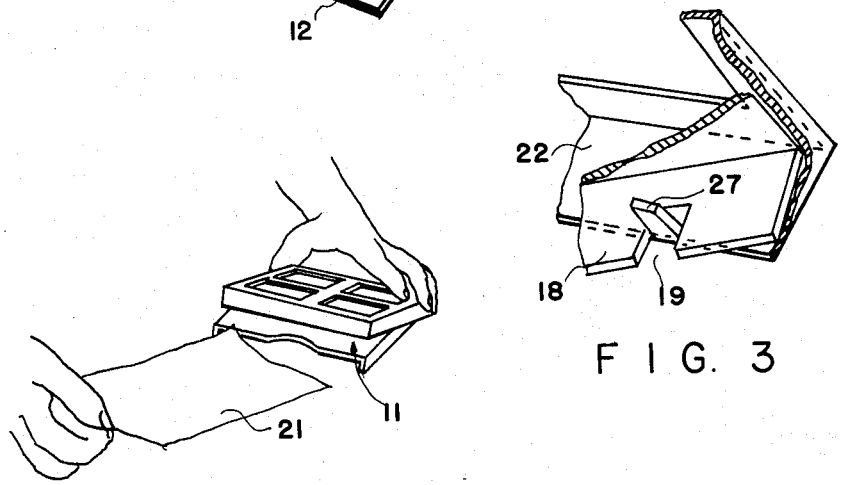
FIG. 2
FIG. 3
INVENTOR.
PACIFICO T. ALFONSI
BY
Francis J. Klempay
ATTORNEY

United States Patent Office 3,262,361
Patented July 26, 1966

3,262,361
PHOTOGRAPHIC ENLARGING EASEL AND MASK
Pacifico T. Alfonsi, 1849 Niles-Cortland Road SE.,
Warren, Ohio
Filed June 2, 1964, Ser. No. 371,965
4 Claims. (Cl. 88—24)

This invention relates to photographic enlarging equipment, and more particularly to improved apparatus for positioning and holding photosensitive paper prior to and during an enlarging exposure by the projection method.

It has been common practice, especially in amateur photo-processing, to position each photosensitive sheet individually in a masking frame or easel which serves as a holding means for said sheets during the exposure. This operation consumes considerable time and the quality of the border obtained is largely a function of the photographer's skill and experience. Improved means have been developed whereby the masking frame is held in the proper position so that the photosensitive paper inserted therein is automatically in position for exposure, but although the results obtained are better, this method, too, is time consuming. It is the general object of my invention, to be hereinafter described, to provide further improvement of these existing means.

A more specific object of my invention is to provide a combination of enlarging easel and masking frame which will allow four exposures to be made in rapid succession by merely moving the masking frame around the easel to pre-positioned stops affixed thereto in such a position as to hold the masking frame in the correct position for exposure.

A further object of my invention is to provide an improved masking frame, to be used in cooperation with the aforementioned easel, which will allow the rapid insertion and positive positioning therein of a standard large-sized sheet of photosensitive paper, said masking frame to provide four exposure openings of equal size so that four smaller prints can be made on one large-sized sheet with a single positioning of the paper in said frame.

A further object of my invention is to provision of a combination easel and masking frame with which even the most unskilled in the art of photography can get consistently good results.

A still further object of my invention is the provision of an easel and masking frame combination of such design and construction that it may be produced easily and economically from such standard materials as sheet metal and/or wood or equivalent material, the principal requirements being those of sufficient strength and opacity.

The above and other objects and advantages of the invention will become apparent upon consideration of the following drawing and detailed specification wherein there is disclosed a preferred embodiment of my invention.

In the drawing:

FIGURE 1 is a perspective view of an easel and masking frame constructed according to the principles of my invention;

FIGURE 2 is a perspective view of the masking frame of FIGURE 1 showing a method of inserting photosensitive sheets therein;

FIGURE 3 is a fragmentary perspective view of the underside of the masking frame showing details of construction.

Figure 4:
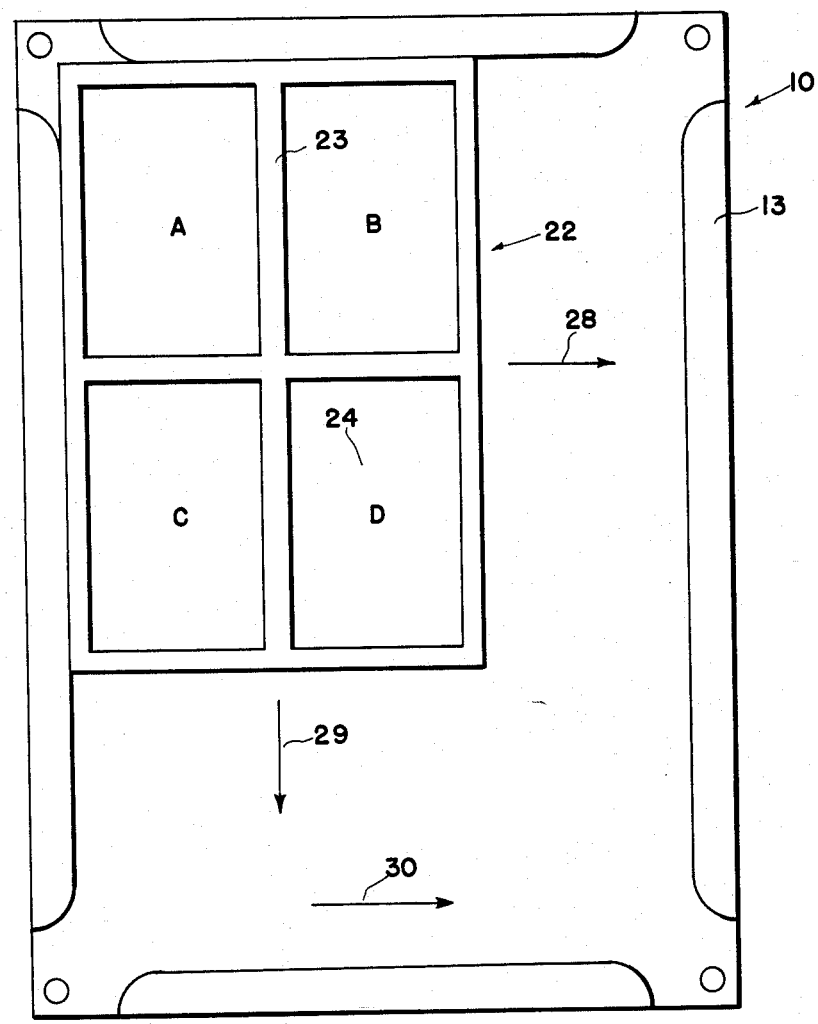
FIGURE 4 is a plan view of the easel and masking frame of FIGURE 1, illustrating the mode of use thereof.

In the drawing the easel is generally denoted by reference numeral 10, and the masking frame is denoted by reference numeral 11.

Referring to the drawing, and to FIGURE 1 in particular, it should be observed that the easel 10 consists of a rectangular base of wood, metal or an equivalent material, said base having a plane smooth surface for purposes of supporting the masking frame 11. Thin strips 13 of material similar to that of the base 12 are affixed by any suitable means along the four edges of the top surface thereof, said strips 13 serving as guides for positioning the masking frame 11. Short rubber plugs 14 are inserted into apertures in each corner of the base 12, said rubber plugs providing a non-slipping four-point suspension for the easel 10.

The masking frame 11 is constructed of wood, metal, or an equivalent material and consists of two independent sections: a base 15 and a masking cover 16. The base 15 has a horizontal, flat, smooth surface 17 for supporting a photosensitive sheet 21, and vertically disposed depending strips 18 on two opposing sides to define supporting legs. A vertical notch 19 (see FIGURE 3) is provided in each leg portion 18 for purposes to be hereinafter explained. Said notches 19 are positioned toward the rear of base 15 and are directly opposed so that an axis through the center of both lies in spaced parallel relationship to the open ends of the base 15. A semicircular section 20 is removed from the center of the front end of the base 15 to provide an access at that point to both sides of the photosensitive paper 21 so that it may be easily gripped by the hand for purposes of insertion and positioning and removal from the masking frame 15.

The masking cover 16 consists of a flat, rectangular top section 23 with four vertically disposed depending portions 22 forming sides, the dimensions of the top section 23 of said masking cover 16 being sufficient to allow it to slip over the base section 15, and the vertical dimension of the depending sides 22 being such that the top section 23 rests on the surface 17 of the base 15 when the unit is assembled.

Four equal-sized rectangular sections 24 are removed from the top section 23 to provide exposure areas for four prints of equal size. The remaining material, forming flange 25 and cross-strips 26, provides a uniform white border around the edge of the prints.

For the sake of said uniformity of the print borders, it is necessary that the cross-strips 26 be twice the width of the flange 25.

As shown in FIGURE 3, a small tab 27 is secured to the bottom of each of two of the depending sides 22 of the masking cover 16, said tabs being positioned so as to coincide with the aforementioned notches 19, the purpose of said tabs 27 being to limit the degree to which the masking cover 16 may be separated from the base 15.

The dimensions of the masking frame 11 and easel 10 are proportioned in such manner that when the longitudinal axis of the frame 11 is parallel to that of the easel 10, and any two adjacent sides of said frame 11 have contact with the inside edges of any two adjacent guide strips 13, the geometric center of the exposure opening 24 diagonally opposite said adjacent sides will lie directly above the geometric center of the easel 10.

In the operation of my invention (see FIGURES 2 and 4) the masking cover 16 is grasped with one hand and lifted unitl it is held by the tabs 27 in the notches 19. Photosensitive paper 21, of the size corresponding to the size of the top surface 17 of the base 15, is grasped in the other hand and inserted into the masking frame, whereupon the cover 16 is replaced and allowed to rest upon the paper 21 to keep it flat and retain it in position. The masking frame 11 is then placed face up upon the surface of the easel 10, said easel having been previously positioned so that its center point coincides with the center of the image desired. The frame 11 is then positioned with its longitudinal axis parallel to that of the easel 10 and with two adjacent sides in contact with the inner edges of two adjacent guide strips 13. One exposure is then made and the frame 11 is moved to another corner of the easel for another exposure, the procedure being repeated until an exposure has been made with the masking frame 10 positioned in each of the four corners of the easel.

Referring to FIGURE 4, the four openings in the masking frame 22 are labeled A, B, C and D, and in the relative position of the parts illustrated the easel 10 would, of course, be so positioned on the table of the projector printer that the projection of the image would fall uniformly within space D. Immediately upon area D being exposed, the frame 22 would be shuttled either in direction 28 or direction 29 to center up either area C or area B, respectively, for exposure. Obviously, if the frame 22 is moved in the direction 29 to expose area B, the next succeeding index could be along the direction 30 to expose area A.

From the preceding description it should now be apparent that my invention has definite advantages over the prior art. With my masking frame and easel combination it is possible to quickly make four exposures in rapid succession by merely moving the masking frame to pre-positioned stops. The print borders are necessarily straight and even, the only opportunity for the element of human error lying in the operation of cutting the four print apart. Moreover, the use of large photosensitive sheets is somewhat more economical than the use of a multiplicity of sheets of smaller size.

Having thus described my invention, what I claim is:

1. An enlarging easel formed of a rectangularly shaped flat base having guide strips affixed to the top surface thereof along its edges, said guide strips enclosing a rectangular area of the top surface of said base; and a masking frame comprising a base with a horizontal flat surface and two vertically disposed depending sides defining supporting legs, a vertical notch provided in each of said depending legs at corresponding positions therein, and a masking cover to fit over said masking frame base, said cover comprising a flat plate with four vertically disposed depending sections forming side, four rectangular sections being removed from the surface of said cover to provide exposure openings, horizontally disposed tabs depending from two of said depending sides in such a manner as to fit into the aforementioned vertical notches, said tabs being operative to limit the degree to which said cover may be separated from said base, said masking frame and easel being of such proportions as to provide positive positioning of one of said four exposure openings substantially above the geometric center of enclosed area of said easel when any two adjacent sides of said masking frame are in contact with any two adjacent guide members and when the longitudinal axis of the masking frame is essentially parallel with that of the easel.

2. Photographic printing apparatus comprising an easel formed of a rectangularly shaped flat base section having guide means positioned along the edges thereof, said guide means enclosing an essentially rectangular area of said base; and a masking frame comprised of a base with a flat surface to support photosensitive paper or the like and means to support said flat surface in spaced parallel relation to the top surface of said easel, and a masking cover positioned over said surface of said base of said masking frame to hold photosensitive paper thereon, aperture in said masking cover to provide exposure areas, means for restricting and guiding the movement of said cover relative to said masking frame base, means for limiting the degree to which said cover may be separated from said masking frame base, said masking frame and easel being of such dimensions that when any two adjacent sides of said masking frame are in contact with any two adjacent members of said guide means and when the longitudinal axis of the masking frame is essentially parallel to that of the easel one exposure opening is centered substantially over the geometric center of the enclosed area of said easel.

3. Photographic printing apparatus comprising an easel formed of a base section with a smooth, even upper surface, and guide means, affixed thereto, at least partially enclosing an essentially rectangular area of the easel surface; and a masking frame to be used in cooperation therewith comprising a base having a flat upper surface and means for holding said surface in spaced relation to said easel surface, and a masking cover to be positioned over said base surface to hold photosensitive paper thereon, said cover having flanges fitting over the side and end edges of said frame to restrain the paper against sliding movement with respect to said frame and cover, a plurality of apertures provided in said masking cover to provide exposure areas, said flanges comprising means for guiding the movement of said cover relative to said masking frame when applying said cover to said frame, said easel and masking frame being of such proportions as to permit each exposure opening to be retained by said guide means substantially above the geometric center of the easel area enclosed by said guide means.

4. Apparatus according to claim 3 further characterized in that said masking cover member is pivotally connected to the said frame at one end thereof, the arrangement being such that single sheets of photosensitive paper of sufficient size to make prints corresponding in number to the exposure areas may be readily inserted in and removed from said masking frame upon upward tilting of said masking cover member.

References Cited by the Examiner

UNITED STATES PATENTS

| | | | |
|---|---|---|---|
| 2,497,559 | 2/1950 | Rice | 88—24 |
| 2,848,923 | 8/1958 | Diefenback | 88—24 |
| 2,925,752 | 2/1960 | Van Deusen | 88—24 |

NORTON ANSHER, *Primary Examiner.*

VANCE A. SMITH, *Assistant Examiner.*